United States Patent [19]

Slocum et al.

[11] Patent Number: 5,038,653
[45] Date of Patent: Aug. 13, 1991

[54] CIRCULAR SAW BLADE

[75] Inventors: Gerald F. Slocum; Larry R. Gray, both of Danville, Va.

[73] Assignee: The Disston Company, Greensboro, N.C.

[21] Appl. No.: 151,487

[22] Filed: Feb. 2, 1988

[51] Int. Cl.$^5$ .............................. B27B 33/08
[52] U.S. Cl. ........................ 83/846; 83/851; 83/852
[58] Field of Search ............. 83/848, 846, 835, 851, 83/852

[56] References Cited

U.S. PATENT DOCUMENTS

| | | | |
|---|---|---|---|
| 156,748 | 11/1874 | Andrews | 83/846 |
| 352,867 | 11/1886 | Greist . | |
| 514,207 | 2/1894 | Bott . | |
| 764,855 | 10/1980 | Russia . | |
| 2,141,504 | 12/1938 | Balfour et al. | 83/846 |
| 2,720,229 | 10/1955 | Drake . | |
| 3,866,504 | 2/1975 | Claesson et al. | 83/852 |
| 4,179,967 | 12/1979 | Clark | 83/846 |
| 4,265,285 | 5/1981 | Fodor . | |
| 4,270,429 | 6/1981 | Brown | 83/851 |
| 4,311,075 | 1/1982 | Sundstrom | 83/848 |
| 4,436,009 | 3/1984 | Ask . | |
| 4,690,024 | 9/1987 | Chaconas | 83/852 |

FOREIGN PATENT DOCUMENTS

| | | |
|---|---|---|
| 476201 | 10/1936 | United Kingdom . |
| 2113144A | 1/1982 | United Kingdom . |
| 2177344A | 1/1987 | United Kingdom . |

Primary Examiner—Frank T. Yost
Assistant Examiner—Eugenia A. Jones
Attorney, Agent, or Firm—Burns, Doane, Swecker & Mathis

[57] ABSTRACT

A circular saw blade is divided into a plurality of circumferential sections each including a number of cutting teeth provided along the circumferential edge of the saw blade. Between each pair of teeth, a gullet is formed having a depth in the radial direction of the blade. The distance between each pair of cutting teeth defines a pitch. The depth of the gullets and the pitch of successive teeth of the saw blade is different from one another.

22 Claims, 4 Drawing Sheets

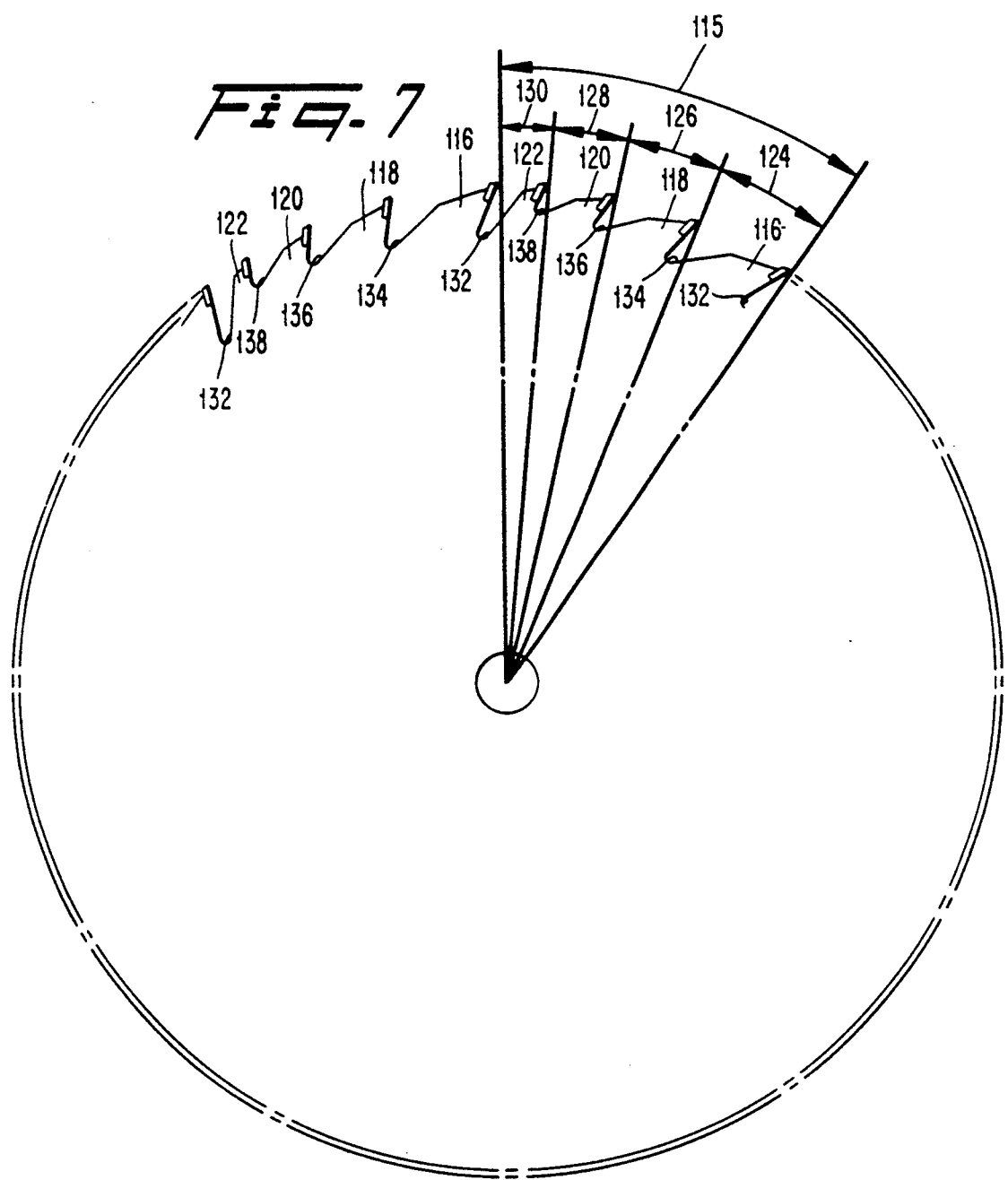

CIRCULAR SAW BLADE

BACKGROUND OF THE INVENTION

1. Field of the Invention

The present invention relates generally to saw blades and, more particularly, to circular saw blades including a plurality of teeth along the periphery thereof.

2. Discussion of the Prior Art

It is known to provide a saw blade having a plurality of evenly sized and spaced cutting teeth formed around its circumference. This standard circular saw blade design has found many applications in the cutting of wood as well as metal members and may be modified to provide certain types of cutting and planing functions. For example, a standard saw blade may include a small number of rip saw type teeth around its circumference so as to provide a rapid cutting of the work material, or a large number of planing type teeth which perform a slow yet smooth cutting of work material. Typically, a blade with a relatively small number of teeth is employed for applications where it is desired to make fast cuts with little concern for the smoothness of the cuts. Alternatively, when smoothness is of importance in an application, a blade having a relatively large number of teeth is employed. Such a blade presents more teeth to the area of the work material to be cut so as to smooth the cut surface as the blade cuts therethrough. However, the speed of the cut is ordinarily reduced.

It has been, and will continue to be, an object of saw blade designers to design saw blades capable of providing both fast and smooth cuts which permit the number of operations to be performed on work materials to be reduced along with the amount of time of cutting operations. It is a further goal of many designers to provide a saw blade capable of providing an acceptable level of performance for an extended period of use relative to the typical life span of other known saw blades.

One known design is illustrated in U.S. Pat. No. 156,748, to Andrews, wherein a single saw blade is comprised of four groups of teeth, each including a number of variably spaced cutting teeth. In the Andrews patent, the first tooth of each group of teeth is the longest and each succeeding tooth has a gradually diminished pitch so that the last one in the group has the shortest pitch. All of the teeth of the Andrews patent are of the same radial depth. As disclosed in the Andrews patent, the purpose of this construction is to increase the amount of work that can be done with a fixed amount of power.

Another known saw blade construction is disclosed in U.S. Pat. No. 352,867, to Greist, and includes the use of two types of cutting teeth in a single blade. In the Greist patent, groups of each type of cutting tooth are arranged around the circumference of the blade to provide alternating types of sawing and planing action during each rotation of the blade. For instance, in an illustrated embodiment of the Greist patent, evenly spaced rip saw teeth having a large pitch and deep radial depths are grouped together and these groups are separated by groups of evenly spaced cross-cut teeth having a small pitch and shallow radial depths. In this manner, Greist attempts to achieve a smooth cutting action with less power than is required by conventional blades.

The circular saw blade illustrated in U.S. Pat. No. 2,720,229, to Drake, includes a substantially standard construction in which a plurality of evenly spaced teeth are provided around the circumference of the blade. However, in the Drake blade, a plurality of, e.g., three, short teeth are provided at equally spaced intervals along the circumference to separate the remaining teeth into groups. In addition, carbide tips having differing configurations are alternately positioned on the teeth to provide a varied cutting path of the saw.

One problem addressed by known saw blade designs is that of vibration which occurs due to harmonic vibration in the moving blade. In U.S. Pat. No. 4,270,429, to Brown, this problem is presented and discussed. In the Brown patent, a saw blade is provided having an odd number of segments each including a number of randomly spaced cutting teeth. By this construction, the goal of reducing such vibrations during a cutting operation is sought to be achieved.

Another blade design attempting to reduce the amount of vibration occurring during a sawing operation is disclosed in U.S. Pat. No. 4,311,075, issued to Sundstrom. In the Sundstrom patent, a circular saw blade is divided into a number of tooth groups in which the pitch of successive cutting teeth varies. All of the groups are provided with the same varied spacing arrangement and all of the teeth have a constant radial depth regardless of the spacing therebetween.

Because reduced noise and vibration and increased cutting speed are objects which are continuously sought, it is desirable to provide further improvements in the construction of circular saw blades to achieve these objects. In addition, it is desired to provide a saw blade capable of operating at least as quickly and quietly as known saw blades, which also has a long life expectancy so as to increase the value thereof.

OBJECTS AND SUMMARY OF THE INVENTION

It is an object of the present invention to provide a circular saw blade having a configuration permitting faster cutting than is possible with standard blades while also ensuring a smooth cut of work material.

It is a further object of the invention to provide a circular saw blade which produces less noise and vibration during operation than standard blades and which requires less power to operate.

Another object of the present invention is to provide a saw blade construction having a longer useful blade life than standard blades and which, therefore, has an increased value over standard blades. Specifically, it is an object of the invention to provide a saw blade which maintains an acceptable level of performance for a longer period of time than known saw blades.

Still another object of the invention is to provide a saw blade which includes a tooth arrangement permitting a single blade to provide a fast cutting having a quality previously experienced only through the use of a relatively slow standard planing blade.

The present invention achieves these objects, as well as many others. In accordance with a first aspect of the present invention, a circular saw blade has a plurality of circumferential sections and a plurality of cutting teeth provided along the circumference of the blade in each circumferential section. A gullet having a depth in the radial direction of the saw blade is formed between each pair of cutting teeth and the distance between each pair of teeth defines a pitch. The pitch and gullet depth of each pair of cutting teeth in each section are different from one another.

The circumferential sections of the saw blade are preferably of equal size and each is provided with an arrangement of teeth which is identical to all other sections. For example, it is possible to provide four sections of ninety degrees each around the blade, each being provided with four teeth having varying pitch and gullet depths. It is within the scope of the present invention to provide four, five, six, eight, ten or any other number of sections around the saw so long as the arrangement of teeth in each section ar provided in accordance with the invention.

It is preferred, regardless of the number of sections employed, that each section include a leading edge tooth and a trailing edge tooth and that the teeth be arranged such that the pitch of the teeth in each section decreases in the direction from the leading edge tooth towards the trailing edge tooth. It is further preferred that the radial depth of successive gullets in each circumferential section also decreases in the direction from the leading edge tooth towards the trailing edge tooth.

In addition to the above-mentioned features of the invention, in a preferred embodiment, the saw blade includes carbide tips on each of the cutting teeth. These carbide tips provide an improved cutting strength to the saw.

In accordance with a further aspect of the saw blade in accordance with the present invention, a plurality of teeth are arranged on the periphery thereof, each being provided with a cutting tip. A first tooth of this plurality of teeth includes a pitch defined as a distance along the circumference of the blade between the cutting tip and the cutting tip of an adjacent tooth which trails the first tooth in the cutting direction of the blade. In addition, the first tooth has a gullet defined as a radial groove in the periphery of the blade in front of the cutting tip in the cutting direction. A second tooth of the plurality of teeth is positioned behind the first tooth in the cutting direction and has a pitch smaller than the pitch of the first tooth and a gullet smaller than the gullet of the first tooth. A third tooth of the plurality of teeth is positioned behind the second tooth in the cutting direction and includes a pitch and gullet which are smaller than the pitch and gullet of the second tooth.

In a preferred embodiment, this pattern is continued to a fourth tooth having a pitch and gullet smaller than that of the third tooth. If desired, this pattern may be continued to a fifth tooth having a pitch and gullet smaller than the fourth tooth, and so on, for as many teeth as appropriate.

In a preferred form of the invention, the first, second and third teeth are adjacent each other on the blade so as to form a group. Several such groups may be provided on the blade.

BRIEF DESCRIPTION OF THE DRAWING

Preferred embodiments of the invention are discussed in the following detailed description which should be considered in connection with the Figures in the accompanying drawing, in which:

FIG. 5 is a schematic view of a saw blade in accordance with another preferred construction of the invention;

FIG. 7 is schematic view of a blade in accordance with yet another preferred construction of the invention.

DETAILED DESCRIPTION OF A PREFERRED EMBODIMENT

A first embodiment of a saw blade construction in accordance with the invention will be discussed with reference to FIGS. 1-4.

Figure 1:
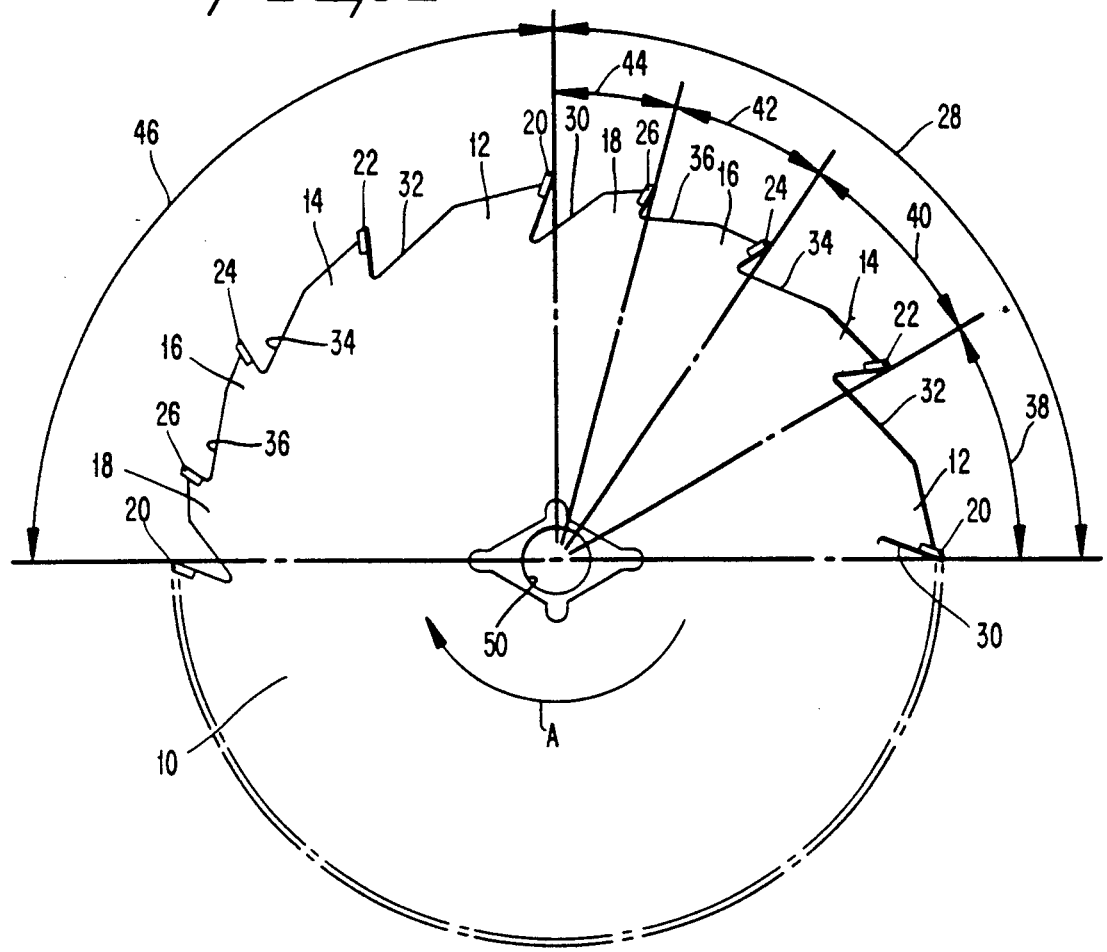
FIG. 1 is a schematic view of a saw blade in accordance with a first preferred construction of the invention.

As shown in FIG. 1, a circular saw blade 10 is provided on its circumference with a plurality of cutting teeth, e.g., teeth 12, 14, 16 and 18, each having a carbide tip 20, 22, 24 and 26. Although not all of the teeth are shown in FIG. 1, it is noted that teeth are provided around the entire circumference of the blade, a number of the teeth being excluded from the drawing for the sake of simplifying a description of the invention. The direction of rotation of the blade 10 is indicated by arrow A.

The distance between the teeth of each pair of teeth in the circumferential direction of the saw blade is defined herein as the pitch of the tooth at the leading edge of the pair in the cutting direction of the blade. The space between the teeth of each pair of teeth is defined herein as the gullet of the trailing tooth of the pair and each gullet has a depth in the radial direction of the saw blade which will be further discussed below. Thus, according to these definitions, each tooth, e.g., tooth 14 on the blade 10, has a tip 22, a gullet 32 provided in front of the tip 22 in the cutting direction of the blade, and a pitch 40 measured from the tip 22 to a tip 24 of an adjacent tooth 16 located behind the tooth 14.

In the embodiment shown in FIG. 1, the teeth 12, 14, 16, 18 are arranged in repeating groups of four teeth in such a way that each group covers a circumferential section 28 of the blade equal to 90 degrees of the circular blade 10. Therefore, there are four groups of four teeth, i.e. a total of sixteen teeth, on the blade 10. Within the circumferential section of the blade making up a single group of teeth, the teeth 12, 14, 16, 18 are spaced an uneven distance from one another and each of the gullets 30, 32, 34, 36 is of a different depth than the gullets adjacent thereto.

Figure 2:
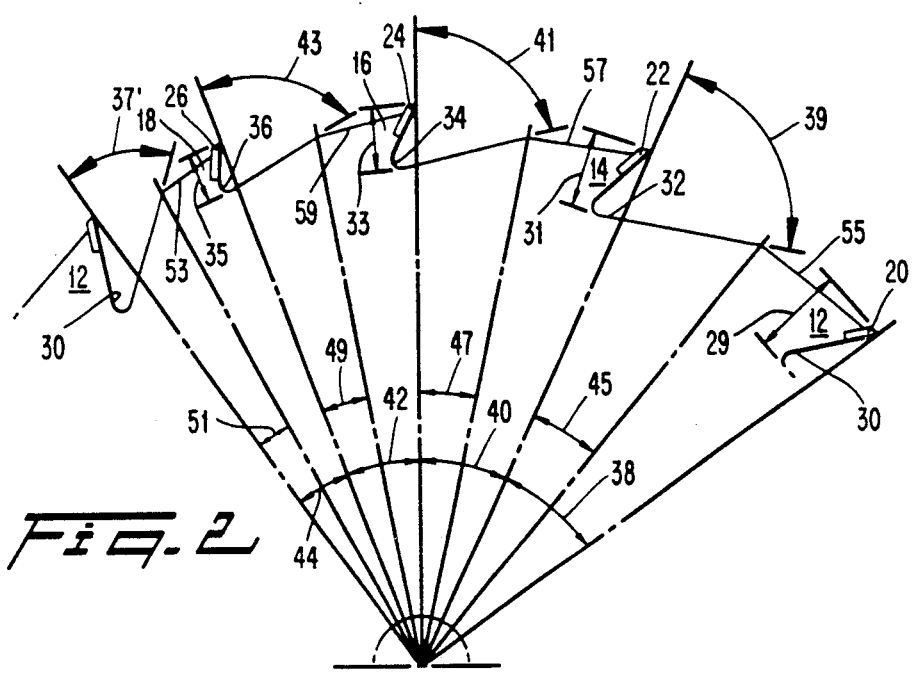
FIG. 2 is a partial sectional view of the circumferential edge region of a saw blade in accordance with the invention.
Figure 3:
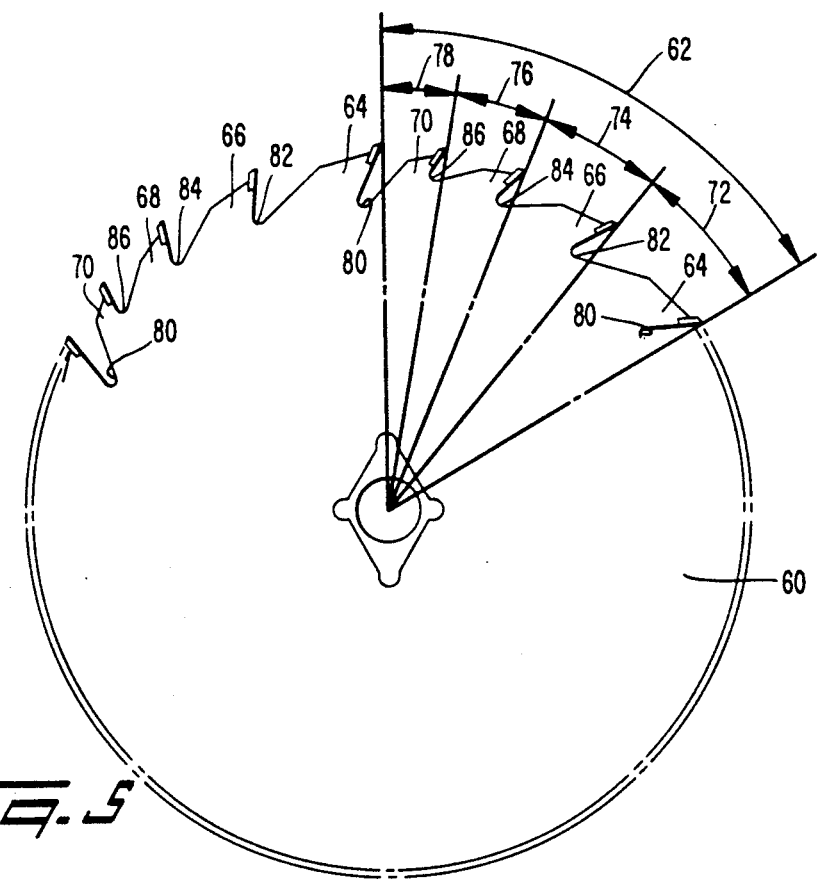

A single section 28 of the saw blade 10 is shown in FIG. 2 and will be discussed in detail with the understanding that each of the sections preferably includes an identical construction. In the section 28 shown in FIG. 2, a leading edge tooth 12 is formed at one end of the section and a trailing edge tooth 18 is formed at the opposite end thereof. The leading edge tooth 12 is the first to contact a work material being cut and the pitch of the tooth 12, i.e. the circumferential distance between the leading tooth 12 and the adjacent tooth 14, in the section 28 is large compared with the pitch of other teeth in the section. For example, in the embodiment shown, the circumferential angle of the blade 38 covered by the pitch of the leading tooth is substantially 30 degrees. The pitch of the second tooth of the section, i.e., the circumferential distance between the second tooth and the third tooth, is somewhat less than the leading tooth pitch. The pitch of the second tooth covers an angle 40 of substantially 25 degrees of the circumference of the blade. The pitch of the third tooth of the section is even less than the pitch of the second tooth and covers an angle 42 of about 20 degrees of the blade's circumference. Finally, the pitch of the fourth tooth of the section, i.e., the distance between the fourth tooth and the first or leading tooth of the adjacent section of the blade, is the smallest pitch on the saw and covers an angle 44 of about 15 degrees of the circumference of the blade 10. Although the dimension for pitch is described with reference to the angle of the blade's circumference covered by the pitch, it is understood that the distance along the circumference may also be used to measure the pitch.

The gullet 30 adjoining the front cutting edge surface of each tooth is formed in the circumference of the saw blade 10 to define the cutting edge of the tooth and to provide a removal path for chips formed during the cutting action of the tooth. Each gullet 30, 32, 34, 36 in the section 28 has a depth in the radial direction of the saw blade 10 which differs from that of the adjacent gullets in the section. For instance, the gullet 30 of the leading edge tooth 12 is provided with a radial depth which is greater than the radial depth of the gullet 32 of the second tooth 14 in the section, the gullet 32 of the second tooth 14 has a radial depth greater than the depth of the gullet 34 of the third tooth 16 and the gullet 34 of the third tooth 16 has a radial depth which is greater than the depth of the gullet 36 of the trailing edge tooth 18. As can be seen from FIG. 1, this pattern of varying tooth pitch and gullet depth preferably repeats itself along the circumference of the second section 46 of the blade as well as along the remaining two sections not shown. Although, in the embodiment shown, every successive tooth in each section includes a pitch and gullet which ar smaller than the pitch and gullet of the adjacent preceding tooth in the cutting direction, it is possible to provide pairs of identical teeth whereby both teeth of each pair include a pitch and gullet smaller than the pitch and gullet of the teeth of a preceding pair of teeth. The number of identical teeth positioned between teeth having a varying pitch and gullet is not limiting. Thus, the blade need not necessarily be provided with a plurality of sections.

By the construction discussed above with reference to FIG. 2, each quarter section of the saw blade shown in the figure is provided with an arrangement of teeth 12, 14, 16, 18 identical to the arrangement provided on every other section. In addition, the teeth along any one section correspond to teeth of a plurality of conventional saw each having different teeth arrangements thereon. For example, again with reference to FIG. 1, the leading edge tooth 12 is provided with a pitch of 30 degrees, which corresponds to a conventional saw blade having twelve equally spaced teeth; the second tooth 14 in each section includes a pitch of 25 degrees which corresponds to a conventional blade spacing somewhat greater than that of a fourteen tooth blade; the third tooth in each section includes a pitch of 20 degrees of the blades circumference which corresponds to a conventional blade spacing of eighteen evenly spaced teeth; and the fourth tooth in each section has a pitch of 15 degrees which corresponds to a conventional saw having an evenly spaced arrangement of twenty-four teeth. Thus, a single blade constructed in accordance with FIG. 1 includes variable sized teeth corresponding to similar teeth of a number of conventional saw blades having from twelve to twenty-four teeth. By such a construction, the benefits of each type of conventional blade is imparted to the single blade 10 of the invention, and the blade 10 provides a fast and smooth cut while increasing the useful life of the blade relative to known blades.

With further reference to FIG. 2, the gullets 30, 32, 34, 36 each have a depth 29, 31, 33, 35 in the radial direction of the blade. As discussed above these depths become successively shallower in the cutting direction within each section. For example, in the saw blade having a 7.05 in. diameter, the depth 29 of the gullet 30 is 0.60 in., the depth 31 of the gullet 32 is 0.50 in., the depth 33 of the gullet 34 is 0.40 in. and the depth 35 of the gullet 36 is 0.30 in. These depth dimensions may be employed regardless of the angular coverage of each of the sections and may also be employed on saw blades having a different diameter than the blade of the example given. However, such absolute dimensions are not intended to be limiting as other dimensions may also accomplish the objects of the invention so long as the depth of the gullet decreases within each section.

Each of the gullets 30, 32, 34, 36 is of a generally trough shape and defines an angle 37, 39, 41, 43 respectively, between a radial line of the blade extending through the tip of the tooth and a line extending along the surface of the gullet opposing the tip. This angle 37, 39, 41, 43, along with the depth 29, 31, 33, 35 of each gullet 30, 32, 34, 36, and the width of the blade, defines the volume of the gullet which is exposed in front of each tooth in the cutting direction for removing chips formed during cutting. In the embodiment shown, the angles 37, 39, 41, 43 are 52°, 77°, 78° and 81° respectively. Thus, the angles 37, 39, 41 and 43 successively decrease in the cutting direction of the blade.

Angles 45, 47, 49, 51 are preferably one-half as large as the angles 38, 40, 42, 44, and define the circumferential location of a junction between the surfaces of the gullets 30, 32, 34, 36 which oppose the tips 20, 22, 24, 26, and surfaces 53, 55, 57, 59 extending to the rear of the tips 26, 20, 22, 24 of the teeth 18, 12, 14, 16 in front of the gullets 30, 32, 34, 36 respectively.

Figure 8:
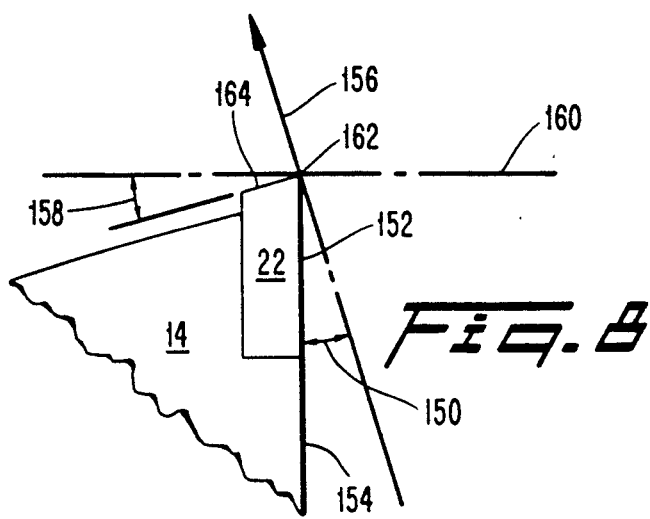
FIG. 8 is a schematic view of a single carbide tip of a tooth constructed in accordance with a preferred embodiment of the invention.

A single tip 22 of a tooth 14 is illustrated in exploded view in FIG. 8. The tip 22, which is representative of each tooth on the blade of the preferred embodiment includes an attack or rake angle 150 of 25°. The face 152 of the tip 22 and the face 154 of the tooth 14 are formed at an angle 150 of 25° to the radial line 156 extending from the axis of the blade 10. It is sometimes conventional to employ a 15° attack or rake angle on circular saw blades. However, such a conventional attack or rake angle was initially utilized on the blade of the present invention and wa found to be unsatisfactory as compared with the results achieved by a blade using an increased attack or rake angle. While the particular numerical value of 25° for the attack or angle has shown improved results, it is within the scope of the invention that other attack or rake angles may be employed. However, it appears that an attack or rake angle greater than the standard 15° produces improved results.

A clearance angle 158 is illustrated in FIG. 8 which is defined as the angle between a line 160 tangent to the circumference of the blade at the cutting edge 162 of the tip 22, and a line extending in the plane of the blade's circumference along the surface 164 of the tip 22. It is preferred that every tooth on the blade be formed with a clearance angle 158 of 15° (within manufacturing tolerances). However, variations of this angle are possible within the scope of the invention.

Figure 3:
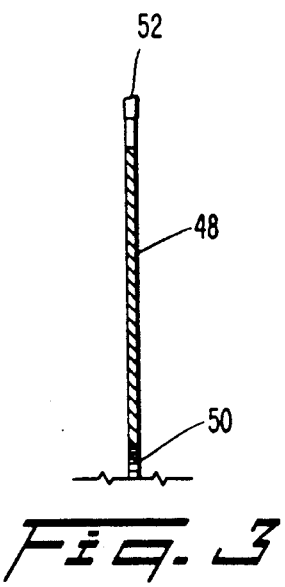
FIG. 3 is a schematic view of a single section of the saw blade of FIG. 1.
Figure 4:
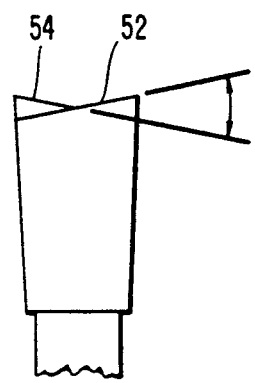
FIG. 4 is a schematic view of a saw blade in accordance with a second preferred construction of the invention.

In FIG. 3, the saw blade is shown to comprise a generally planar body portion 48 in which the gullets are formed along with a center hole 50 for enabling the blade 10 to be mounted on a sawing apparatus. It is preferred that the tooth tips 20, 22, 24, 26 be formed of carbide material and that every alternate tip be shaped with an upper edge 52 which is angled in the same direction with respect to the plane extending in a direction tangent to the circumference of the saw blade 10 at the tip. Each of the remaining tips are shaped with the upper edge 54 (FIG. 4) thereof angled in an opposite direction with respect to the tangential plane at the tip so that each tooth on the blade makes a path which is different from the path made by the previous tooth on the blade. This arrangement is schematically illustrated in FIG. 4, wherein the profile of a first tooth 12 is shown overlayed on the profile of a tooth 14 immediately adjacent thereto. As can be understood, the paths of the adjacent tips 20, 22 differs so as to present uncut work material to the successive teeth of the blade during cutting.

A second construction of a circular saw blade in accordance with the invention is shown in FIG. 5. In this figure, the blade 60 is provided with an arrangement including 6 equally sized sections, only one of which 62 is illustrated, each covering substantially 60 degrees of the circumferential edge of the blade 60. The blade may have the same diameter of the above-discussed blade or may have a different diameter. Within each section there are provided four teeth 64, 66, 68, 70 of varying pitch and gullet depth, the arrangement within each section being preferably identical to the arrangement in all of the other sections. In this embodiment of the invention, the leading edge tooth 64 in each section has a pitch covering an angle 72 of 20 degrees of the blade's circumference, which corresponds to a conventional tooth on a blade having 18 equally spaced teeth; the second tooth 66 in each section is provided with a pitch covering an angle 74 of 17 degrees of the blade's circumference, corresponding to the spacing of a conventional 21 tooth blade using equal spacing of the teeth; the third tooth includes a pitch covering an angle 76 of 13 degrees, which is typical of evenly spaced teeth on a 28 tooth blade; and the trailing edge tooth has a pitch covering an angle 78 of 10 degrees of the circumference of the blade, corresponding to a 36 tooth blade employing equal spacing of the teeth. The gullets 80, 82, 84, 86 adjacent the teeth 64, 66, 68, 70 of each section are variably sized with the gullet 80 of the leading edge tooth 64 being the deepest and the trailing edge gullet 86 being the most shallow.

As with the embodiment of FIG. 1, the second embodiment of the invention permits a single circular saw blade to provide a plurality of teeth having configurations similar to teeth employed in several different conventional saws of varying type. By this construction, the saw blade of the invention may be employed in place of any one or more conventional saw blades to provide a cutting which is as smooth as a saw having a large number of planing type teeth and as fast as a saw having a small number of cutting type teeth. In addition, the blade constructed in accordance with the invention will provide an acceptable level of cutting ability for a longer time than known blades.

Figure 6:
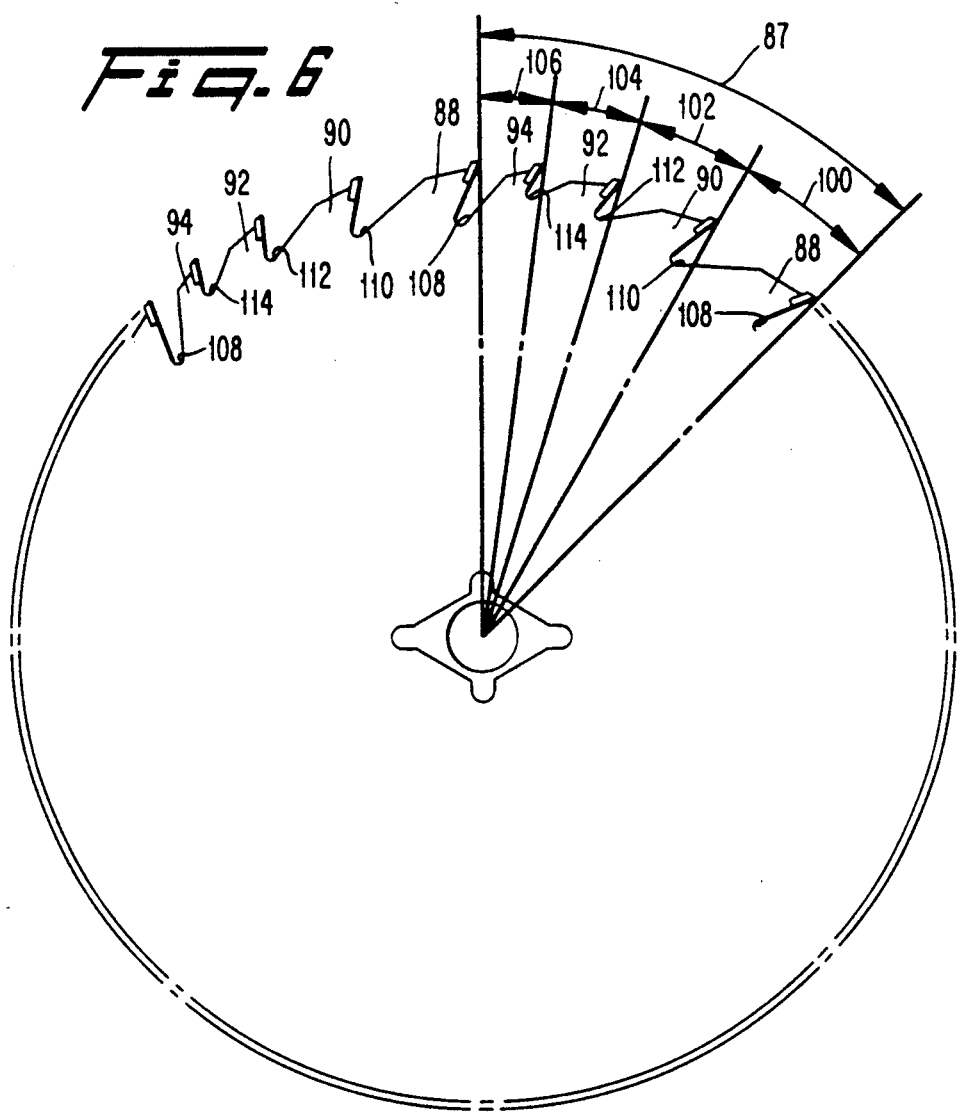
FIG. 6 is a schematic view of a saw blade in accordance with still another preferred construction of the invention.

FIGS. 6 and 7 illustrate two further embodiments of a saw blade in accordance with the present invention, which differ from the first two embodiments and from each other in the size of the sections employed on the circumference of the blades and the pitch and gullet depth of each of the teeth of each section.

The embodiment of FIG. 6 illustrates a construction whereby eight sections, each covering an angle 87 having a value of 45 degrees of the circumference of the blade, are each provided with four cutting teeth 88, 90, 92, 94. The pitch of the four teeth in each section varies in the cutting direction of the blade covering angles 100, 102, 104, 106 having values of 15, 12.75, 9.75 and 7.50 degrees respectively of the circumference of the blade. In addition, the depth of the gullets 108, 110, 112, 114 of the teeth 88, 90, 92, 94 decrease in the cutting direction of blade from the leading edge tooth 88 towards the trailing edge tooth 94. By this construction, the teeth on the blade resemble the teeth of saws having conventional evenly spaced tooth arrangements ranging from 24 teeth to 48 teeth. As mentioned previously, this construction combines the advantages gained from the use of each of these different conventional blades into the single blade of the invention.

Each section of the blade of FIG. 7 extends along an angle 115 having a value of 36 degrees of the circumference of the blade and includes four teeth 116, 118, 120, 122 provided with pitch angles 124, 126, 128, 130 having values of 12, 10.25, 7.75 and 6 degrees respectively. As with the previous embodiments, the depth of the gullets 132, 134, 136, 138 of the teeth varies in the cutting direction of the blade from the leading edge tooth 116 towards the trailing edge tooth 122. The teeth 116, 118, 120, 122 of the blade constructed in accordance with this embodiment are similar to the teeth of various conventional saw blades of this diameter having ranges of between 30 and 60 equally spaced teeth.

By providing a circular saw blade in accordance with any of these above-mentioned embodiments, or in accordance with the invention as broadly set forth in the claims, it is possible to provide a saw blade which has a longer life, is quieter, faster, and experiences less vibration than conventional saw blades.

In order to show the significance in the differences between a saw blade made in accordance with the invention and saw blades presently being marketed, tests have been verified by an independent source which indicate that saw blades constructed in accordance with the present invention and including 16 or 24 teeth, operate at a speed which is faster than any one of a number of presently marketed conventional saws having a similar number of cutting teeth. Specifically, the 16 tooth blade according to the present invention produced the fastest cutting speed of all models tested, and the 24 tooth blade was faster than all but one other blade tested. Further, the saw blade of the present invention provides a smoother cut than any of the conventional saw tested except for a saw marketed as the Vermont American Laser 20-tooth blade which provided a smoother cut according to the tests performed.

The test for roughness, which was also conducted on blades made in accordance with the invention as well as conventional, presently marketed blades, included measuring the relative smoothness of cuts by using a dial indicator with a 0.068 inch ball probe which was mounted on a Bridgeport Milling machine. The Oak sample to be measured was clamped to a table and leveled by adjusting each end to read 0 on the indicator. Roughness data was then obtained by measuring the absolute deviation from the mean surface between each consecutive peak and valley throughout the usable length of the sample. The width between each height measurement was recorded for the record. Roughness measurements were taken on the front edge and then the back edge of each sample.

Roughness is defined as surface irregularities produced by the cutting edge of a tool and is specified as the vertical distance from peak to valley and the distance from peak to valley of the waves. Waviness is comprised of surface irregularities which are of greater spacing than the roughness. A roughness index for each sample was computed by converting all the height data to positive numbers and then calculating the arithmetic average. The grand average of the front and back measurements was the roughness index for the applicable sample. Since surface irregularities in height are the prime indication of roughness, width data was not used in the index calculations. The higher the index value, the rougher the average finish of the sample.

While this invention has been illustrated and described in accordance with a preferred embodiment, it is recognized that variations and changes may by made and equivalents employed herein without departing from the invention as set forth in the claims.

What is claimed is:

1. A circular saw blade adapted to be rotated in a cutting direction, comprising:
   a plurality of circumferential sections; and
   a plurality of cutting teeth provided along the circumference of the blade in each circumferential section, each of said teeth having a cutting tip and having a pitch and gullet, the plurality of teeth in each section including a first tooth and a last tooth, said last tooth being positioned behind the first tooth with respect to the cutting direction, the teeth in each section being configured and arranged such that the pitch of the teeth in each section progressively decrease from the first tooth to the last tooth and such that the radial depth of the gullet of each tooth progressively decreases from the first tooth to the last tooth.

2. The circular saw blade in accordance with claim 1, wherein the plurality of circumferential sections are of equal size.

3. The circular saw blade in accordance with claim 2, wherein each section is a 90 degree circumferential section of the saw blade.

4. The circular saw blade in accordance with claim 2, wherein each section is a 90 degree circumferential section of the saw blade.

5. The circular saw blade in accordance with claim 2, wherein each section is a 45 degree circumferential section of the saw blade.

6. The circular saw blade in accordance with claim 2, wherein each section is a 36 degree circumferential section of the saw blade.

7. The circular saw blade in accordance with claim 1, wherein each of the teeth includes a carbide tip.

8. The circular saw blade in accordance with claim 1, wherein the first tooth of each section in the cutting direction of the saw blade is a leading edge tooth and the last tooth of each section in the cutting direction of the saw blade is a trailing edge tooth, the pitch between teeth in each circumferential section decreasing in the direction from the leading edge tooth towards the trailing edge tooth.

9. The circular saw blade in accordance with claim 8, wherein the first tooth of each section in the cutting direction of the saw blade is a leading edge tooth and the last tooth of each section in the cutting direction of the saw blade is a trailing edge tooth, the radial depth of successive gullets in each circumferential section decreasing in the direction from the leading edge tooth towards the trailing edge tooth.

10. The circular saw blade in accordance with claim 1, wherein the first tooth of each section in the cutting direction of the saw blade is a leading edge tooth and the last tooth of each section in the cutting direction of the saw blade is a trailing edge tooth, the radial depth of successive gullets in each circumferential section decreasing in the direction from the leading edge tooth towards the trailing edge tooth.

11. The circular saw blade in accordance with claim 1, wherein each circumferential section includes an arrangement of cutting teeth which is similar to all other sections.

12. The circular saw blade in accordance with claim 1, wherein tips of adjacent teeth are oppositely angled relative to a plane of the saw blade.

13. The circular saw blade in accordance with claim 1, wherein each cutting tooth includes a cutting edge and a cutting surface, said cutting surface being provided at an angle to a radial line extending from a central axis of the circular saw blade through the cutting edge, the angle being greater than 20°.

14. The circular saw blade in accordance with claim 13, wherein said angle is approximately 25°.

15. A circular saw blade adapted to be rotated in a cutting direction to perform a cutting operation, comprising:
   a plurality of teeth arranged on the periphery of the blade, each of said teeth including a cutting tip;
   a first tooth of said plurality of teeth having a pitch defined as a distance along the circumference of the blade between the cutting tip and the cutting tip of an adjacent tooth which trails the first tooth in the cutting direction of the blade, the first tooth including a gullet defined as a radial groove in the periphery of the blade in front of the cutting tip in the cutting direction;
   a second tooth of said plurality of teeth being positioned behind the first tooth in the cutting direction and having a pitch smaller than the pitch of the first tooth and having a gullet with a radial depth smaller than the radial depth of the gullet of the first tooth; and
   a third tooth of said plurality of teeth being positioned behind the second tooth in the cutting direction and having pitch smaller than the pitch of the second tooth and having a gullet with a radial depth smaller than the radial depth of the gullet of the second tooth.

16. The circular saw blade in accordance with claim 15, wherein the first, second and third teeth are adjacent each other on the periphery of the blade.

17. The circular saw blade in accordance with claim 15, wherein said first, second and third teeth form a tooth group and said blade includes a plurality of such tooth groups thereon.

18. The circular saw blade in accordance with claim 15, further comprising a fourth tooth of said plurality of teeth being positioned behind the third tooth in the cutting direction and having a pitch smaller than the third tooth and having a gullet with a radial depth of the gullet smaller than the radial depth of the gullet of the third tooth.

19. The circular saw blade in accordance with claim 18, wherein said first, second, third and fourth teeth form a tooth group and said blade includes a plurality of tooth groups.

20. The circular saw blade in accordance with claim 15, wherein each cutting tooth includes a cutting edge and a cutting surface, said cutting surface being provided at an angle to a radial line extending from a central axis of the circular saw blade through the cutting edge, the angle being greater than 20°.

21. The circular saw blade in accordance with claim 20, wherein said angle is approximately 25°.

22. A circular saw blade adapted to be rotated in a cutting direction to perform a cutting operation, comprising:
at least two circumferential sections; and
a plurality of cutting teeth provided along the circumference of the blade in each circumferential section, each of said teeth having a cutting tip, a pitch being defined as the distance along the circumference of the blade between the cutting tip thereof and the cutting tip of an adjacent trailing tooth in the cutting direction, and a gullet being defined as a radial groove in the periphery of the blade in front of the cutting tip in the cutting direction, wherein both the pitch and gullet of each tooth in each section are smaller than the pitch and gullet of the tooth positioned in front thereof with respect to the direction of cutting.

* * * * *